United States Patent [19]

Irwin

[11] 3,933,216
[45] Jan. 20, 1976

[54] VEHICLE WITH ALIGNED INTAKE AND EXHAUST PIPES

[75] Inventor: Gordon A. Irwin, Harwood, N. Dak.
[73] Assignee: Steiger Tractor Inc., Fargo, N. Dak.
[22] Filed: Feb. 20, 1975
[21] Appl. No.: 551,305

[52] U.S. Cl............ 180/54 R; 180/64 A; 180/69 C; 180/89 A
[51] Int. Cl.² .................. B60K 13/02; B60K 13/04
[58] Field of Search........ 180/69, 544 R, 540, 54 E, 180/64 A, 89, 89 A, 54 R, 1 R, 1 F, 51, 52

[56] References Cited
UNITED STATES PATENTS

| | | | |
|---|---|---|---|
| 2,429,732 | 10/1947 | Roos | 180/54 R X |
| 3,174,575 | 3/1965 | May et al. | 180/69 C |
| 3,179,201 | 4/1965 | May et al. | 180/69 C |
| 3,270,829 | 9/1966 | Steiger et al. | 180/51 |
| 3,338,326 | 8/1967 | Hafer et al. | 180/69 C |
| 3,419,099 | 12/1968 | Brumbaugh et al. | 180/69 C |
| 3,805,909 | 4/1974 | Koeppen | 180/69 C |

FOREIGN PATENTS OR APPLICATIONS

| | | | |
|---|---|---|---|
| 887,262 | 9/1943 | France | 180/54 A |

Primary Examiner—M. Henson Wood, Jr.
Assistant Examiner—Milton L. Smith
Attorney, Agent, or Firm—Frederick E. Lange

[57] ABSTRACT

A self-propelled vehicle having an enclosed operator cab in which the air intake pipe and the exhaust stack are mounted diagonally in line with one of the front corner posts of the cab so that although both the air intake pipe and the exhaust stack are close to the engine, they present a minimum of obstruction to the view of the operator. The portions of the intake pipe and exhaust stack visible to the operator are painted in the same dark color as the cab, in contrast to a lighter color employed on the rest of the vehicle. The vehicle may be provided with a hood which extends inwardly of the intake pipe and exhaust stack and is hinged to the vehicle at the front so that it can be tilted forward. The vehicle may be of the type which is articulated and in which the rear of the cab overhangs the rear section of the vehicle.

6 Claims, 3 Drawing Figures

U.S. Patent  Jan. 20, 1976  3,933,216
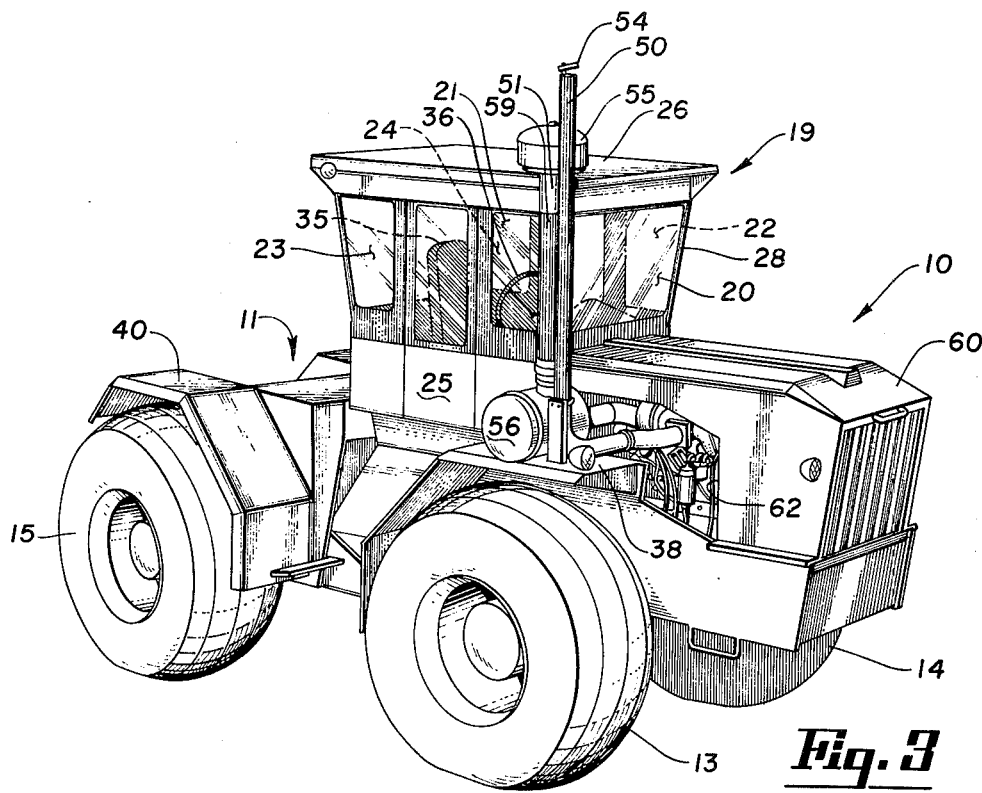
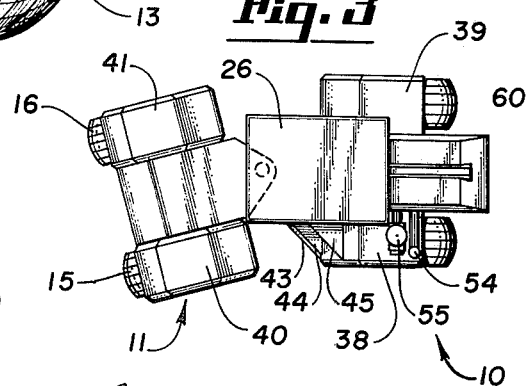
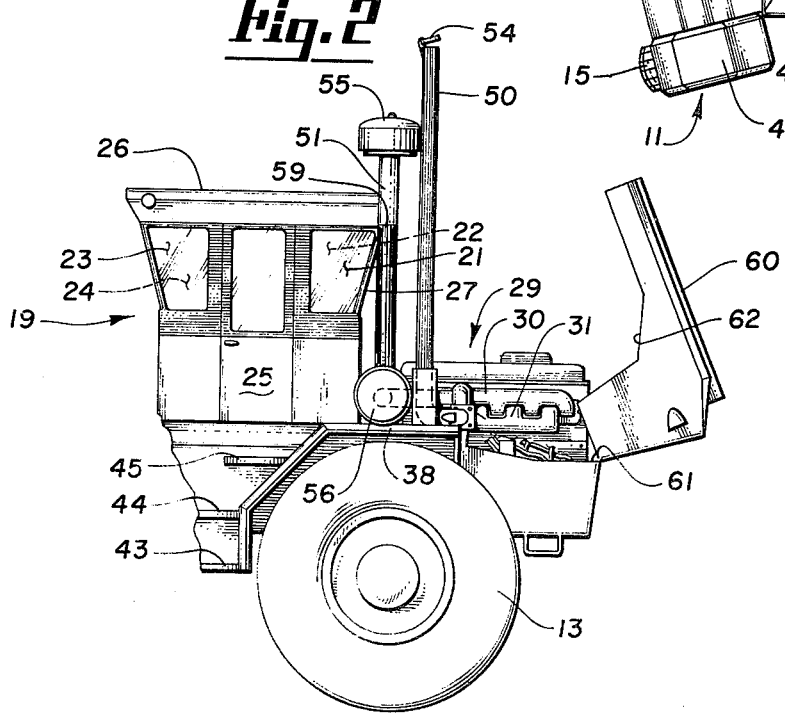

VEHICLE WITH ALIGNED INTAKE AND EXHAUST PIPES

BACKGROUND OF THE INVENTION

With large self-propelled vehicles having an internal combustion engine for propelling the vehicle, it is quite customary to have an air intake pipe and an exhaust stack mounted close to the engine. The air intake pipe and the exhaust stack are often vertically disposed so as to draw in the air substantially above the ground and to discharge the exhaust gases well above the cab in which the operator is located. Because of reducing the length of passage for the air as much as possible, the air intake pipe has quite commonly been located so as to extend through the hood. Similarly, the exhaust stack is often extended through the hood. The result is that it is very difficult to readily open the hood and it has been quite common to provide a hood in the form of a plurality of sections which must be removed by removing detachable fasteners. Furthermore, the presence of the exhaust stack and the air intake pipe in front of the operator obstructs his view. While many of these large vehicles are operated on plowed fields, or in construction work, it is till desirable that the operator has as unobstructed a view as possible.

It has been proposed to provide such a large vehicle in which the air cleaner is located in front to one side of the hood adjacent the front corner post and the exhaust stack is located to the rear adjacent a rear corner post. While this arrangement has the advantages of reducing the obstruction to the driver's view, it has the drawback that by running the exhaust pipe to the rear of the cab, considerable heat is introduced into the cab and the back pressure in the exhaust manifold is increased undesirably. Inasmuch as the heat within the cab is a very definite problem, even to the point where many of these cabs are air conditioned, it is highly undesirable to run an exhaust pipe closely adjacent to one side of the cab for the full length thereof.

Furthermore, where the vehicle is of the type that is articulated and where the roof of the cab tends to overhang the rear portion of the vehicle, it becomes somewhat difficult to locate an exhaust stack at the rear of the cab without interferring with turning of the vehicle, particularly when the turns are very tight.

SUMMARY OF THE PRESENT INVENTION

The present invention is concerned with a self-propelled vehicle having an enclosed operator cab in which the air intake pipe and the exhaust stack are mounted diagonally in line with one of the front corner posts of the cab so that although both the air intake pipe and the exhaust stack are close to the engine, they present a minimum obstruction to the view of the operator.

Furthermore, by locating the exhaust stack and the intake pipe diagonally in line with the corner post, they can be placed outside of the edge of the hood thus making it possible to employ a hood which can be hinged in front and tilted upwardly to provide relatively unobstructed access to the engine between the front thereof and the air intake pipe and exhaust stack, both of which are located closely adjacent the front corner post of the cab.

In order to further reduce the interference with the view of the operator by the intake pipe and exhaust stack, the portions of the exhaust stack and air intake pipe which extend adjacent to the window portions of the cab are painted in a dark color which is similar to that of the cab but which is different from that of the rest of the vehicle. Thus, as the operator moves his head, there is less tendency for him to notice the air intake pipe and exhaust stack.

It is contemplated that the invention is particularly applicable to a vehicle of the articulated type in which the hood of the cab tends to overhang the rear section of the vehicle. The proposed arrangement of the exhaust stack and intake pipe diagonally in line with one of the front corner posts results in a situation in which there is no exhaust stack adjacent the rear of the cab to interfere with turning about a relatively narrow radius.

Various other objects of the invention will be apparent from a consideration of the accompanying specification, claims and drawing.

DESCRIPTION OF THE DRAWING

FIG. 1 is a front perspective view of my improved sefl-propelled vehicle;

FIG. 2 is a fragmentary side elevational view of the front portion of my improved vehicle with the hood shown in its open position; and FIG. 3 is a top plan view on a reduced scale showing the relative positions of the front and rear portions when the vehicle is being turned.

DESCRIPTION OF THE PREFERRED EMBODIMENT

Referring first to FIG. 1, which as previously indicated is a front perspective view of the improved self-propelled vehicle, the vehicle is shown as having a front section 10 and a rear section 11. These two sections are preferably connected together through a pivotal connection which permits relative movement of the two sections about a vertical axis. Turning is effected by the use of two hydraulic cylinders on each side of the longitudinal center axis, one of which is extended and the other contracted when turning is desired. A vehicle of this general type is shown in the Steiger et al U.S. Pat. No. 3,270,829.

The front section 10 is supported by two wheels 13 and 14 mounted on an axle, not specifically shown, which is rigidly secured to the frame of the vehicle. The back section 11 is similarly supported by two wheels 15 and 16 mounted upon an axle (not shown) rigidly secured to the frame of the back section. The front section 10 has a body portion comprising a frame in which is supported an enclosed operator's cab 19 having a windshield 20, front side windows 21 and 22 and rear side windows 23 and 24. The cab is further provided with a door 25 and a roof 26. The cab is provided with two front corner posts 27 (see FIG. 2) and 28 which aid in supporting the windshield 20 and the side windows 21 and 22. The corner post 27 is disposed between windshield 20 and side window 21 whereas the corner post 28 is disposed between the windshield 20 and the side window 22. The cab, in the form shown, tapers outwardly towards the top so that the overall area of the roof 26 is substantially greater than the cross sectional area of the base of the cab.

It is to be understood that the cab is supported upon a frame of the vehicle in a conventional manner. Also supported on the frame is an internal combustion engine 29 which is provided with an intake manifold 30 and an exhaust manifold 31. The engine, as far as the present invention is concerned may be any suitable internal combustion engine such as a diesel engine. In many engines of this type, an exhaust gas driven turbo supercharger is employed for compressing the intake air. For this reason, as will be pointed out, it is desirable that the exhaust pipe and the intake pipe be in close proximity.

Referring back to the cab 19, the cab encloses the normal operating controls and a seat for the driver. The seat is shown in dotted lines and designated by the reference character 35. Located in front of the operator's seat 35, in the usual manner, is a steering wheel 36 which is employed for controlling the steering which, as previously explained, may be by operation of hydraulic cylinders to control the relative positions of the two sections 10 and 11.

Secured to the frame of the vehicle are front fenders 38 and 39 and rear fenders 40 and 41. The fenders 38, 39, 40 and 41 perform the usual function of partially covering the tires mounted on the wheels 13, 14, 15 and 16 and minimize the danger of the operator coming in contact with one of these wheels. The front fender 38 also serves as a support for a plurality of steps 43, 44 and 45 which lead up to the door 25 to permit the operator to easily climb into the interior of the cab 19. The size of these vehicles is such that the lower portion of the door 25 is located well above the ground and it would be very difficult for the operator to get into the cab if it were not for these steps.

Extending vertically upwardly from above the front fender 38 are an exhaust stack 50 and an air intake pipe 51. Both the exhaust stack 50 and the air pipe 51 are supported from the fender 38. The exhaust stack 50 is connected to the exhaust manifold 31. At its upper end, there is secured thereto a deflector 54 which permits the escape of exhaust gases but tends to prevent the entrance of moisture or any foreign objects. Secured to the upper end of the air intake pipe 51 is an inverted dome 55 which permits the access of air underneath into the top of the air intake pipe but again prevents rain or foreign objects from dropping down into the air intake pipe. A prefilter may be located in the inverted dome 55. At its lower end, the air intake pipe 51 connects with an air cleaner 56 supported on the fender 28. The air cleaner is, in turn, connected to the intake manifold previously indicated. The air may pass through a compressor driven by an exhaust gas driven turbo supercharger before entering the intake manifold.

It will be obvious from FIGS. 1 and 3 that the exhaust stack 50 and the air intake pipe 51 are disposed so that they are diagonally in line with the right front corner post 27. In other words, a plane passing through the longitudinal center axes of the exhaust stack 50 and the air intake pipe 51 will pass through the corner post 27 and will be diagonal with respect to the longitudinal axis of the vehicle. The significance of this is that while both the exhaust stack 50 and the air intake pipe 51 are located close to each other and to the internal combustion engine, they present a minimum of obstruction to the view of the operator. The corner post already exists and, while small, still presents a slight obstruction to his view. The exhaust pipe 50 and the air intake pipe 51 tend to be located within an arc formed by lines intersecting at the eyes of the operator and passing on each side of the edges of the corner posts. Thus, the exhaust stack 50 and air intake pipe 51 add very little to the already necessary obstruction that is presented by the relatively small corner post 27.

To further aid in preventing disturbance to the operator by reason of the presence of the exhaust stack 50 and the air intake pipe 51, the interior of the cab and the exterior thereof are painted in a relatively dark color such as black, in contrast to the color of the remaining portion of the cab, which can be relatively light and bright. The exhaust stack 50 and that portion of the air intake pipe extending up to a line 59 are painted the same dark color as the cab, as shown in the drawing by shading. It will be noted that line 59 is slightly above the top of the windows of the cab. Thus, the portions of the exhaust stack and air intake pipe seen by the operator are of the same color as the interior of the cab and hence do not present a contrast in appearance to him. Since the color is black or another very dark color, the overall affect presented is one in which the exhaust stack 50 and the air intake pipe 51 are relatively unnoticeable by the operator.

By reason of this arrangement just described, it is possible to have both the exhaust stack and the air intake pipe very close to each other and to the engine. This is extremely important. As pointed out above, it permits the use of an exhaust gas driven turbo supercharger. Furthermore, the passage for the flow of air to the intake manifold and for the exhaust gas to the exhaust stack is relatively short. The importance of this passage to the exhaust stack being short is that there is relatively little back pressure introduced, even though the exhaust gas may pass through a turbine. Furthermore, there is no hot exhaust pipe extending back along side of the cab to introduce heat into the cab. A large majority of large tractors of the type with which the present invention is particularly concerned, are air conditioned to protect the operator against the dust conditions that often exist in a plowed field and against the outside heat which could become quite severe within an enclosed cab on a hot summer day. If the exhaust pipe were to extend past the cab, the amount of air conditioning required would be greatly increased.

It is, of course, also highly desirable that the air intake pipe be located at the front of the tractor. In order to reduce the amount of dirt that must be taken out by the filters, it is obviously desirable that the air entering underneath the dome 55 be as clean as possible. If the air intake pipe were located in back of the cab, it would be much closer to the implements being drawn by the tractor and thus much more subject to drawing in dusty air.

There is a further advantage with an articulated tractor to not having either the exhaust stack or the air intake pipe located adjacent the rear of the cab. As is evident from FIG. 3, the roof 26 of the cab actually overhangs sustantially the rear section 11. It is obviously necessary that both the exhaust stack 50 and the air intake pipe 51 extend well above the roof of the cab. If either of these pipes were located to the rear of the cab, they would tend to obstruct turning of the vehicle, particularly when sharp turns are being made. By placing both the exhaust stack 50 and the air intake pipe 51 at the front, there are no obstructions in the back which would limit the turning radius of the tractor.

By placing both the exhaust stack 50 and the air intake pipe 51 to one side of the engine, it is possible to have a hood that can be tilted in front. As best shown in FIG. 2, the hood 60 is hinged at its front bottom portion 61 so that by releasing a suitable catch (not shown) the entire hood 60 can be tilted forward to the position shown in FIG. 2. This permits unobstructed access to the engine back from its front to the exhaust pipe 50 on one side. On the opposite side, there is unobstructed access all the way back from the front to the cab 19. While it is quite common to leave openings through the hood through which limited access can be had to the engine, these openings must of necessity be relatively limited. In FIG. 1, such an opening is bounded by the line 62. While this opening is adequate for certain purposes, it is obviously inadequate to permit any substantial maintenance work to be made on the engine. In the past, the hoods have often been formed of sections which are separately secured to the frame because of the necessity of running the exhaust and air intake pipes through the area covered by the hood. Because of these exhaust and air intake pipes, it was impossible to have a tiltable hood. By locating both of the pipes to one side of the hood, however, it is now possible to permit the hood to be tilted as described above.

CONCLUSION

It will be seen that I have developed an improved self-propelled vehicle in which the intake pipe and the exhaust stack are both located closely adjacent to the internal combustion engine but in a position in which they offer relatively little obstruction to the view of the operator. It will furthermore be seen that by reason of the manner in which they are painted the same color as the interior of the cab in contrast to the color employed elsewhere that they are relatively unnoticeable by the operator. Furthermore, by reason of both the exhaust stack and the air intake pipe being located to one side of the hood, it is possible to employ a tiltable hood.

While I have described a specific embodiment of my invention, it is to be understood that this is for purposes of illustration only and that my invention is limited solely by the scope of the appended claims.

I claim:

1. A self-propelled vehicle having an internal combustion engine for propelling the vehicle and an enclosed operator's cab,
   said internal combustion engine being disposed forwardly of said cab and having an intake manifold and an exhaust manifold,
   said operator's cab comprising a seat for the operator, controls for controlling the operation of the engine and the steering of the vehicle, and an enclosure for the cab including a windshield, side windows and upright front corner posts disposed between said windshield and said side windows,
   a vertical intake pipe connected to said intake manifold and extending above the top of said cab,
   a vertical exhaust stack connected to said exhaust manifold and extending above the top of the cab, and
   means mounting said intake pipe and said exhaust stack on said vehicle to one side of and in front of one of said corner posts and closely adjacent thereto with the longitudinal axes of said intake pipe and exhaust stack lying in a substantially vertical plane extending diagonally with respect to said windshield and through said corner post so that said intake pipe and said exhaust stack are both disposed closely adjacent to said engine but offer the minimum of obstruction to the view of the operator.

2. The vehicle of claim 1 in which a hood extends over the engine inwardly of said intake pipe and exhaust stack, said hood being hinged to said vehicle adjacent the front of said engine so that the hood may be tilted forward to provide relatively unobstructed access to said engine betwen the front thereof and the intake pipe and exhaust stack.

3. The vehicle of claim 1 in which an inverted dome is secured to the top of said intake pipe above the tops of said windshield and said side windows.

4. The vehicle of claim 1 in which the connection between said intake pipe and the intake manifold includes an air cleaner which is disposed on the vehicle below the bottoms of said windshield and said side windows.

5. The vehicle of claim 1 in which the cab and the portions of the intake pipe and exhaust stack readily visible from the interior of the cab are painted in the same color which is darker than the color in which other portions of the vehicle are painted.

6. The vehicle of claim 1 in which the vehicle includes two sections which are pivotally connected to each other and in which said cab is disposed on the front section and the rear portion overhangs the front of the rear section.

* * * * *